United States Patent Office 3,159,533
Patented Dec. 1, 1964

3,159,533
PHOSPHORUS-CONTAINING INSECTICIDES AND METHOD
John W. Nelson, Lansing, Ill., assignor to Sinclair Research, Inc., Wilmington, Del., a corporation of Delaware
No Drawing. Filed May 29, 1962, Ser. No. 198,470
11 Claims. (Cl. 167—30)

The present invention relates to insecticidal compounds and to the discovery that certain compounds are highly effective insecticides especially for phytophagous mites.

Of the currently available insecticides, even the more highly regarded, such as S-(1,2-dicarbethoxyethyl)O,O-dimethyl phosphorodithioate, commercially available as Malathion, oftentimes require more than a single application for a substantially 100% kill. For instance, previous experience has shown that thoroughly wetting, for example, clusters of phytophagous insects such as aphids, with a water emulsion of one tablespoon of a 50% solution of Malathion per gallon of water in a spray, often requires a second application the next day for a complete kill. The inconvenience and cost of subsequent applications obviously give rise to the need for an insecticide capable of effecting a substantially complete kill in one application.

It has now been found that the insecticidal materials of the present invention can provide a substantially 100% kill in one application and do so at concentrations considerably smaller than generally employed with other highly regarded insecticides such as Malathion. The insecticidal compounds of the present invention can be represented by the following structural formula

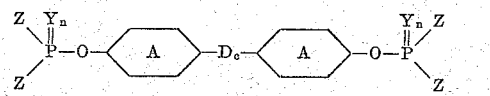

wherein P=phosphorus; O=oxygen; D is a divalent aliphatic hydrocarbon radical of 1 to 5 carbon atoms and $c=0$ to 1; Z is a radical selected from the group consisting of (a)
(b)
(c)

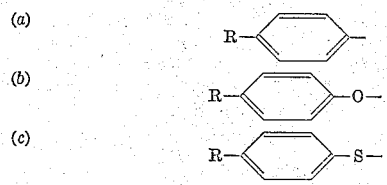

in which R is selected from the group consisting of hydrogen and an alkyl radical of 1 to 20 carbon atoms.

is a cyclic radical selected from the group consisting of phenyl and cyclohexyl; Y is a Group VIA atom of up to 52 atomic number, such as oxygen, selenium, tellurium and sulfur; and $n$ is 0 to 1. At least one of the Z radicals on each phosphorus atom should contain an R group when oil solubility of the compound is desired and preferably the R group will average 5 or more carbon atoms. When both sulfur and oxygen are present in the compound it is preferred that the R group average 12 or more carbon atoms when oil solubility is wanted.

In general the insecticidal compounds of the present invention are the condensation products of a bisphenol or bisphenol alkanes such as 2,2-bis(4-hydroxyphenyl) propane or the corresponding cyclohexyl compounds such as 2,2-bis(4-hydroxycyclohexyl) propane with (I) A monophenol or thiophenol and a phosphorous halide; or (II) A phenyl phosphorous halide; or
(III) A phenyl phosphorous halide and a monophenol or thiophenol.

Thus, depending upon whether the reactants of I, II or III are selected for condensation with the particular bisphenol or hydrogenated bisphenol, the particular phosphorous halide or benzene phosphorous chloride employed, the compounds of the present invention can be di-phosphites, diphosphates, dithiophosphates, diphosphonites, diphosphonates, dithiophosphonates, di-phosphinites, di-phosphinates or dithiophosphinates.

The cyclic

radicals can be substituted, if desired, with non-interfering groups and it is preferred that they be halogenated for instance, with from 1 to 4 halogens of atomic number of 17 to 35, such as chlorine, bromine or iodine. Particularly preferred bisphenols are the bis(3,5-dichloro) compounds such as 2,2-bis(3,5-dichloro-4-hydroxyphenyl) propane.

The monophenol and/or thiophenol reactants of the present invention can be alkylated as with an alkyl group of 1 to 20 carbon atoms, advantageously 4 to 12 carbon atoms; the alkyl group being preferably located in a para-position to the —SH or OH group. Particularly suitable alkylated phenols and thiophenols are, for example, cresols, para tertiary butyl phenol, para tertiary octylphenol, para tertiary butyl thiophenol, thioxylenol and the like.

Examples of appropriate phosphorous halides are phosphorous trichloride, phosphorous oxychloride, thiophosphoryl chloride. Suitable phenyl phosphorous halides are, for instance, phenyl phosphoric dichloride, phenyl phosphorous thiodichloride, preferably wherein the phenyl group is alkylated as with alkyl groups of 1 to 20 carbon atoms, preferably 4 to 12 carbon atoms.

The compounds of the present invention can be conveniently prepared in a hydrocarbon solvent, for instance toluene, xylene, etc. at atmospheric pressure at temperatures of from about 100 to 250° C., generally from about 100 to 150° C., using an amine such as pyridine, triethylamine, etc. as a hydrogen halide acceptor. The diphosphates and diphosphites can be prepared, for instance, by first slowly adding 2 moles of a monophenol or thiophenol to 1 mole of the appropriate phosphorus halide, for example, PCl₃ or POCl₃, to replace two of the halide atoms. Two of the resulting monohalide molecules are then coupled with the bis hydroxy reactant such as 2,2-bis(4-hydroxyphenyl) propane or 2,2-bis(4-hydroxycyclohexyl) propane. The diphosphonites and diphosphonates can be prepared respectively by reacting equimolecular proportions of a benzene phosphonohalide or a benzene phosphinous halide and the monophenol or thiophenol and then reacting the resulting product with the bis compound reactant in a molar ratio of about 2:1. The diphosphinites and diphosphinates can be prepared, for instance, by reacting directly in equimolar proportions a dibenzylphosphonohalide or a dibenzylphosphinous halide and the bis compound reactant. The dithiophosphates, dithiophosphonates and dithiophosphinates of the present invention can be prepared by employing the appropriate phosphorous thiohalide or alternatively by sulfurizing, as with flowers of sulfur, the diphosphite, diphosphonite or diphosphinite compounds.

The insecticidal compounds of the present invention can be employed in the same manner as other known insecticides. For example, they can be used per se or diluted or extended with suitable inert solid or liquid insecticidal carriers or solvents. Suitable solid carriers are, for instance, talcs, natural clays, pyrophyllite, diatomaceous earth, fuller's earth, flours such as walnut shell, wheat, redwood, soya or cottonseed flours. Such solid compositions are preferably employed in the form of powders. Suitable insecticidal liquid carriers are, for example, water and solvents having a viscosity at 20° C. of less than about 0.01 poise which include, for instance, paraffinic hydrocarbons; alcohols, especially lower alkanols such as methanol, ethanol and isopropanol; ketones especially the lower dialkyl ketones such as acetone or methyl ethyl ketone; aromatics such as xylenes and toluenes; and other solvents within this definition which have no detrimental effect on the insecticidal properties of the active ingredient.

The compounds may also be suitably emulsified in water. Most advantageously the compounds are first dissolved in a suitable solvent and the solution emulsified in water. Examples of suitable dispersing and emulsifying agents known commercially as Brij, Span 80, Tween 85, Renex, Triton X–45 and Triton X–100.

Brij is the series of polyoxyethylene fatty alcohol derivatives commercially produced by Atlas Powder Company. An example is oxyethylated lauryl alcohol. Renex is a polyoxyethylene ester of a mixture of fatty and resin acids.

Span 80 is also commercially available (Atlas Powder Company) and is comprised of long chain fatty acid partial esters of hexitol anhydrides. It is an oily liquid having a flash point of about 410° F., a fire point of about 545° F. and a specific gravity of about 1.00 to 1.05. The long chain fatty acids which are employed in producing the fatty acid partial esters of hexitol anhydride contain about 12 to 24 carbon atoms per molecule. The acids can be saturated or unsaturated and include, for example, lauric, palmitic, stearic and oleic acids. By hexitol anhydride is meant inner ethers having one cyclic oxygen per ring derivable from a hexahydric alcohol by intermolecular condensation and includes the monoanhydric and dianhydro derivatives, i.e., hexides, hexitans, mannides, mannitans and the like. By partial ester is meant that the hydroxy groups of the anhydride are not all esterified; mono-, di- and triesters and mixtures thereof are preferred and these can be simple or mixed esters.

Tween 85 is the reaction product of about 5 mols of ethylene oxide and one mol of sorbitan trioleate, and is a product of the Atlas Powder Company. It is an oily liquid at 25° C. having a flash point of about 565° F., a fire point of about 645° F. and specific gravity of about 1.00 to 1.05. Span 80 and Tween 85 are both disclosed in U.S. Patent No. 2,695,877 to Nichols.

Triton X–45 and Triton X–100 are polyether alcohols available commercially from the Rohm & Haas Company. They comprise alkyllauryl polyether alcohols having the general formula R—(O—$CH_2$—$CH_2$)$_n$—OH where R is an alkylaryl radical and $n$ is an integer from about 5 to 100 or more, preferably about 5 to 25. The tritons are the preferred polyether alcohols and are liquid mixtures of homologous polyether alcohols. Triton X–45 is readily miscible with formalin and the common organic solvents. Triton X–100 is essentially identical with Triton X–45 differing primarily in the average length of the polyether chains. Triton X–100 is water-soluble at room temperature, is miscible with alcohol and compatible with esters, ketones and aromatic hydrocarbons.

The compounds of the present invention where employed in a suitable insecticidal carrier are present in effective concentrations, that is, in an amount that will effect a substantial, or even an essentially complete, kill. Generally, the active ingredient is present in concentrations of at least about 0.01 weight percent, preferably at least about 0.04 weight percent, of the composition. Although there is no upper limit to the concentration of active ingredient employable, usually no more than about 0.1 weight percent is required to obtain the desired results. The amount might of course be up to about 1% or more if desired.

The insecticidal materials of the present invention can be applied for their intended purpose in many ways. The most advantageously preferred method is to spray a liquid composition, preferably an aqueous emulsion containing the active ingredient, onto the insects. Although the insecticides of the present invention are particularly effective against homopterous insects such as aphids, cicadas, scale insects, Mexican beetles etc., it is also highly toxic against other insects such as houseflies.

The following examples are inclined to illustrate the preparation of the condensation products of the present invention but are not to be considered limiting. Any method apparent to one skilled in the art can be employed in preparing the componds.

EXAMPLE I

*2,2-Bis[3,5-Dichloro-4-(Para Tert. Butylthiophenyl-Para Tert. Octylphenyl Thiophosphate)Phenyl]Propane*

A reaction flask was flushed with nitrogen and a blanket of nitrogen was continued into the flask during the addition of the phenols. To the flask were charged 165 g. pyridine and 137 g. (1 mole) of $PCl_3$ weighted directly into 600 g. para-tertiary butyl thiophenol diluted with 400 g. toluene were slowly added over one hour and ten minutes. The flask temperature was 88° C. and the heat was turned off. Five hundred grams of toluene were then added. Over the next hour and ten minutes 206 g. (1 mole) of para-tertiary octylphenol dissolved in 500 g. toluene were then added. The temperature was 94° C. Nitrogen introduction was discontinued and heat was applied to the flask. The mixture was stirred at 110–111° C. for 10.5 hours before it was turned off for the remainder of the night. The next morning agitation was started and the flask heated to 55° C. Then 183 g. (0.5 mole) of tetrachlorobisphenol A dissolved in 600 g. toluene at 80° C. and one gram of anhydrous $MgCl_2$ were added. The mass was allowed to stir at 111° C. for the next 10 hours. One gram of $MgCl_2$ was added during this time, after about 5 hours. The next day at room temperature the mass was filtered. The filtrate was washed 3 times with a 1:1 water methanol mixture. It was then stirred with anhydrous $NaHCO_3$ and Drierite for 30 minutes and allowed to stand overnight. It was then filtered and dried overnight again with Drierite and solid $NaHCO_3$. It was again filtered and topped to 232° C. at 8 mm. The yield was 477 g. (82% theory). It analyzed 4.71% P, 5.57% S, 11.2% Cl. This product was sulfurized by treating 442 g. (0.38 mole) with 24 g. (0.76 mole) sulfur flowers in 154 g. toluene at 128° C. (reflux temperature) for 32 hours. It was topped to 184° C. overhead and 68° C. pot temperature at 6 mm. pressure. A 100% yield was obtained of the dithiophosphate which analyzed 4.26% P, 10.0% S, 11.3% Cl, 0.006% N and had an acid number of 17.6.

EXAMPLE II

*2,2-Bis[3,5-Dichloro-4-(Di Para Tertiary Octylphenyl Phosphite) Phenyl] Propane*

A flask was flushed with nitrogen to remove the air and a nitrogen blanket was employed to prevent hydrolysis of the $PCl_3$ and/or $PH_3$ formation, during the monophenol addition. To 257 g. (3.25 moles) of pyridine and 137 g. (1 mole) of $PCl_3$ in 800 g. toluene, while stirring vigorously, were slowly added, over about one hour, 412 g. (2 moles) para-tertiary octylphenol dissolved in 600 g. toluene. The temperature rose from 28° C. to 53° C. during the addition. Heat was then applied to the flask via a heating mantle, the nitrogen turned off and a reflux condenser was attached, which was protected from the air with a drying tube. After about one-half hour 200 g. toluene were added and fifteen minutes later the toluene started to reflux at a pot temperature of 113° C. The mixture was stirred at reflux for 6 hours and then allowed to stand and cool overnight. The next morning 183 g. (0.5 mole) 2,2-bis(3,5-dichloro-4-hydroxyphenyl) propane dissolved in 1000 g. toluene was added and the flask contents stirred and heated to reflux temperature of 112° C. It was maintained at 112° C. for 7 hours and then allowed to stand and cool overnight. The next day the pyridine hydrochloride was filtered off and washed with toluene. The filtrate was washed with water, dilute NaHCO₃, and then twice with water again. Methanol was used to break the emulsions formed. Finally it was allowed to dry over anhydrous calcium sulfate over the week-end. The mixture was then filtered and the filtrate topped to 226° C. at 10 mm. pressure. The bottoms product weighed 575 g. (92.5% theory) and was an off-white soft solid. It analyzed 4.24% phosphorus and 10.5% chlorine.

EXAMPLE III

*2,2-Bis[3,5-Dichloro-4-(Di Para Tertiary Octylphenyl-Thiophosphate) Phenyl] Propane*

Into a suitably sized flask were charged 400 g. of the diphosphite prepared in Example II above, 20 g. of sulfur flowers and 150 g. toluene. The mixture was heated and stirred at reflux temperature of 129° C. for 22.5 hours. It was then topped to 186° C. at 6 mm. The bottoms weighing 420 g. were a dark yellow color and analyzed 4.07% phosphorus, 6.21% sulfur and 9.93% chlorine.

EXAMPLE IV

*2,2-Bis[4-(Di Para Tertiary Octylphenyl Phosphite) Cyclohexyl] Propane*

This compound was made in a similar manner as Example I. The para tertiary octylphenol in toluene was added to PCl₃ in pyridine and toluene over 50 minutes while the reaction temperature rose from 28° C. to 66° C. It was heated and stirred for 6.5 hours at 114° C. 2,2-bis(4-hydroxycyclohexyl) propane partially dissolved in ether was added at 28° C. The ether was removed by distillation, toluene added and the mixture stirred at 112° C. for 4.5 hours. After filtering off the pyridine hydrochloride at room temperature, the filtrate was washed 3 times with water using methanol to break the emulsion. After drying, the mixture was topped to 203° C. at 4 mm. An appreciable amount of unreacted para tertiary octylphenol was removed during topping. The pale yellow plastic product, obtained in 82.5% yield, analyzed 5.65% phosphorus and acid number 2.0.

EXAMPLE V

*2,2-Bis[4-(Di Para Tertiary Octylphenyl-Thiophosphate)Cyclohexyl] Propane*

The diphosphite of Example IV was sulfurized for 24 hours at 125° C. After drying the mixture was topped to 180° C. at 5 mm. The product analyzed 5.39% phosphorus and 3.65% sulfur.

EXAMPLE VI

*2,2-Bis[4-(Di Para Tertiary Octylphenylphosphate) Cyclohexyl]Propane*

This compound was made similar to Examples I and II. Two moles of para tertiary octylphenol in 600 g. of toluene were added to one mol of phosphorus oxychloride in 3.25 moles of pyridine and 500 g. toluene over one hour. After stirring at 114° C. for 8 hours and cooling to room temperature, 0.5 mole of 2,2-bis(4-hydroxycyclohexyl) propane, slurried in 1000 g. ether and 300 g. acetone, and about one gram of anhydrous MgCl₂ were added. After removing the ether and acetone by distillation, the mixture was stirred at 113–115° C. for 4½ hours during which time about one gram each of anhydrous MgCl₂ and AlCl₃ were added. The filtered mass was washed with water and dilute NaHCO₃ followed by 3 water-methanol washes and dried. It was topped to 200° C. at 4 mm. The yield was 63.3% theory. The product analyzed 7.0% phosphorus and 0.0% chlorine.

EXAMPLE VII

*2,2-Bis[3,5-Dichloro-4 (Di Para Tertiary Octylphenyl Phosphate) Phenyl] Propane*

Two preparations of this compound were made in the same manner employed in Example VI except that 2,2-bis(3,5-dichloro-4-hydroxy phenyl) propane was employed instead of 2,2-bis (4-hydroxy cyclohexyl) propane. The two preparations differed in the use of solvent, toluene was used in one designated (*a*) and xylene in the other designated (*b*). (*a*) was topped to 215° C. at 8 mm. and (*b*) to 208° C. at 4 mm. The products were dark green hard solids and analyzed as follows:

|  | Percent P | Percent Cl |
|---|---|---|
| (*a*) | 4.95 | 11.1 |
| (*b*) | 4.42 | 9.3 |

EXAMPLE VIII

*2,2-Bis[3,5-Dichloro-4-(Para Tertiary Octylphenyl-Benzene-Phosphonate) Phenyl] Propane*

The flask was flushed with nitrogen to remove the air. The N₂ was continued into the flask. Eighty grams of pyridine and 390 g. (2 moles) phenylphosphonic dichloride weighed into 400 g. xylene were charged at room temperature. Stirring was started and heat was applied to the flask. Over the next 40 minutes 412 g. (2 moles) para tertiary octylphenol dissolved in 500 g. xylene were added dropwise or in a small stream. The N₂ inflow was discontinued, the flask stopped at that neck and the heat was turned up. Forty-five minutes later at 144° C. the xylene started refluxing. Then 250 g. xylene were added for better mixing and the reaction allowed to continue for 4 hours and 10 minutes before being shut down for the night. The next morning the stirrer and heat were turned on. After 25 minutes and at a flask temperature of 35° C., 166 g. pyridine, 366 g. (1 mole) tetra-chlorobis-phenol A dissolved in 1000 g. xylene at 75° C. and 1 g. anhydrous AlCl₃ were added. After one hour refluxing started at 140° C. After about 1½ hours the material turned green and 1 g. AlCl₃ was added. After 1¾ hours later another gram of AlCl₃ was added. It was then allowed to react for about 3½ hours before being shut down for the night. The next day the pyridine hydrochloride was filtered off using a Büchner funnel and vacuum. The filtrate was washed with water,

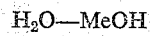

H₂O—MeOH and NaHCO₃ solution until basic. An additional H₂O wash turned it acid again. It was then stirred with Drierite and solid NaHCO₃ for 1 hour and after adding Attapulgus fines, 30 minutes longer. It filtered clear and was still green. It was then evaporated down on a steam bath overnight. The next morning a precipitate was visible and it was filtered again. A portion (500 g.) was again evaporated down to 365 g. but no more precipitation occurred. The mass was then topped to 225° C. at 7 mm. A green product was obtained in a yield of 86% of theory, which analyzed 5.79% phosphorus, 13.3% chlorine and Acid No. 44.9.

EXAMPLE IX

*2,2-Bis[3,5-Dichloro-4 (Para Tertiary Octylphenyl-Benzene-Thiophosphonate) Phenyl] Propane*

This compound was prepared in essentially the same manner as in Example VIII above. Both were one mole runs. Three weights differed in that an extra 80 g. pyridine was used at the start of the reaction and 412 g. (2 moles) phenyl-phosphorous thiodichloride were weighed into 600 g. xylene, instead of 390 g. (2 moles) phenylphosphonic dichloride into 400 g. xylene, with 250 g. added after the octyl phenol.

The filtrate was not washed with NaHCO₃ solution after water and H₂O—MeOH washing. It was dried the same way. No precipitate occurred on steam bath removal of the toluene. A black product was obtained in 85% yield (theory) and analyzed 5.98% phosphorus, 12.3% chlorine, 6.25% sulfur and Acid No. 44.9.

EXAMPLE X

*2,2-Bis[3,5-Dichloro-4-(Di Para Tertiary Butylphenyl-Phosphate) Phenyl] Propane*

This compound was prepared in the same manner as the compound of Example VII except that butyl phenol was employed instead of octyl phenol. The product was a dark green solid and analyzed 5.81% phosphorus, 12.0% chlorine and Acid No. 59.9.

To demonstrate the highly effective insecticidal properties of the condensation products of the present invention the following test was conducted.

EXAMPLE XI

The condensation product of Example I together with 3 emulsifiers were added to toluene to provide a solution having the following composition:

|  | Percent |
|---|---|
| Cond. product of Example I | 7.1 |
| Tween 81[1] | 9.5 |
| Renex[2] | 6.5 |
| Triton X-45[3] | 3.0 |
| Toluene | Balance |

[1] Reaction product of about 5 moles of ethylene oxide and one mole of sorbitan trioleate.
[2] Polyoxyethylene ester of a mixture of fatty and resin acids.
[3] A tertiary octyl benzene polyether alcohol having an average of about 5 ether radicals.

An aqueous emulsion was then formed by adding two tablespoons of this composition per gallon of water. Clusters one to two inches long of green aphids that infested the tips of new growth in a Scarlet Quince hedge were thoroughly wetted by spraying them with the aqueous emulsion. A substantially 100% kill resulted.

EXAMPLE XII

Essentially the same results can be obtained by employing the condensation products of Examples II through X in an emulsion as prepared in Example XI.

EXAMPLE XIII

Satisfactory results can also be obtained employing an inert solid as the carrier for the compound of the present invention. For example a suitable dust for application can be prepared by mixing thoroughly 0.1% by weight of the additive of Example I and 99% talc and grinding the mixture to an average particle size of less than 50 microns that enables application with conventional dusting equipment.

It is claimed:

1. A method of killing insects which comprises contacting the insects with a compound having the formula:

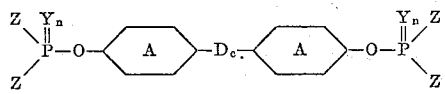

wherein P=phosphorus; O=oxygen; D is a divalent saturated hydrocarbon radical of 1 to 5 carbon atoms and $c$ is 0 to 1; Z is a radical selected from the group consisting of:

(a) 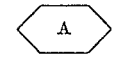

(b) 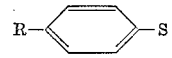

(c) 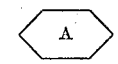

in which R is selected from the group consisting of hydrogen and an alkyl radical of 1 to 20 carbon atoms;

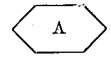

is a cyclic radical selected from the group consisting of phenyl and cyclohexyl; Y is a Group VIA atom of up to 52 atomic number and $n$ is 0 to 1.

2. A method of killing insects which comprises contacting the insects with an insecticidal composition consisting essentially of about 0.01 to 1 weight percent of a compound having the structural formula

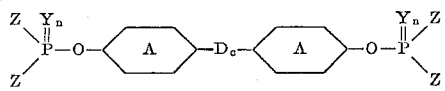

wherein P=phosphorus; O=oxygen; D is a divalent saturated hydrocarbon radical of 1 to 5 carbon atoms and $c$ is 0 to 1; Z is a radical selected from the group consisting of:

(a) 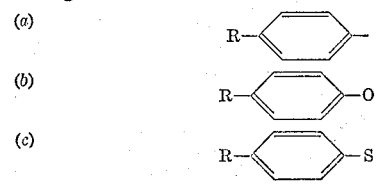

in which R is selected from the group consisting of hydrogen and an alkyl radical of 1 to 20 carbon atoms;

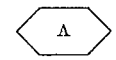

is a cyclic radical selected from the group consisting of phenyl and cyclohexyl; Y is a Group VIA atom of up to 52 atomic number and $n$ is 0 to 1 and an inert insecticidal adjuvant as a carrier therefor.

3. The method of claim 2 wherein Y is oxygen, Z is the radical

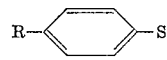

wherein R is an alkyl radical of 1 to 20 carbon atoms, $n=1$ and

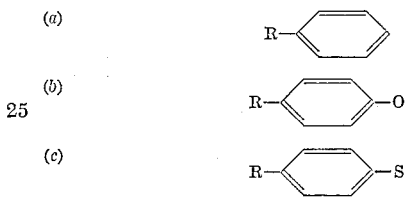

is phenyl.

4. The method of claim 2 wherein Y is sulfur, Z is the radical

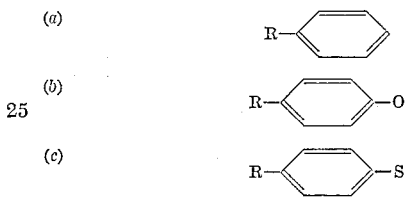

wherein $r$ is an alkyl radical of 1 to 20 carbon atoms, $n=1$ and

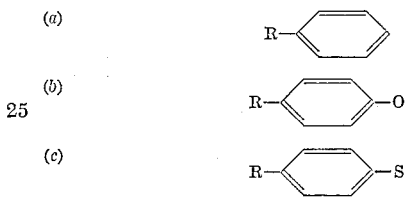

is phenyl.

5. The method of claim 2 wherein the carrier is a liquid having a viscosity at 20° C. of less than about 0.01 poise.

6. The method of claim 5 wherein the solution of the compound is emulsified in water.

7. A method of killing insects which comprises contacting the insects within an insecticidal composition consisting essentially of about 0.01 to 1 weight percent of a compound having the structural formula

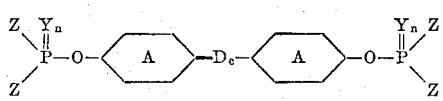

wherein P=phosphorus; O=oxygen; D is a divalent saturated hydrocarbon radical of 1 to 5 carbon atoms and $c$ is 0 to 1; Z is a radical

wherein R is an alkyl radical of 1 to 20 carbon atoms; A is phenyl halogenated with 1 to 4 halogen atoms of atomic number 17 to 35; Y is sulfur and $n=1$; and an inert insecticidal adjuvant consisting essentially of a liquid having a viscosity at 20° C. of less than about 0.01 poise.

8. An insecticidal composition containing as an active ingredient about 0.01 to 1 percent of a compound having the formula

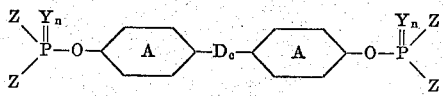

wherein P=phosphorus; O=oxygen; D is a divalent saturated hydrocarbon radical of 1 to 5 carbon atoms and $c$ is 0 to 1; Z is a radical selected from the group consisting of:

(a) 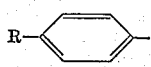

(b) 

(c) 

in which R is selected from the group consisting of wherein P=phosphorus; O=oxygen; D is a divalent satu-

is a cyclic radical selected from the group consisting of phenyl and cyclohexyl; Y is a Group VIA atom of up to 52 atomic number and $n$ is 0 to 1, and an insecticidal carrier selected from the group consisting of inert insecticidal solids and liquids having a viscosity at 20° C. of less than about 0.01 poise.

9. The composition of claim 8 wherein the active ingredient is present in an amount of about 0.01 to 0.1 percent by weight.

10. The composition of claim 8 wherein the carrier is a solvent having a viscosity at 20° C. of less than about 0.01 poise.

11. The composition of claim 9 wherein the solution of the compound is emulsified in water.

References Cited in the file of this patent
UNITED STATES PATENTS
3,053,877      Birum et al. _____ Sept. 11, 1962

UNITED STATES PATENT OFFICE
CERTIFICATE OF CORRECTION

Patent No. 3,159,533                  December 1, 1964

John W. Nelson

It is hereby certified that error appears in the above numbered patent requiring correction and that the said Letters Patent should read as corrected below.

Column 10, line 2, strike out "wherein P=phosphorus; O=oxygen; D is a divalent satu-" and insert instead -- hydrogen and an alkyl radical of 1 to 20 carbon atoms; --.

Signed and sealed this 27th day of April 1965.

(SEAL)
Attest:

ERNEST W. SWIDER                  EDWARD J. BRENNER
Attesting Officer                  Commissioner of Patents